Sept. 10, 1929. M. W. ARROWOOD Re. 17,427
APPARATUS FOR HANDLING POWDERED FUEL
Original Filed March 14, 1923 2 Sheets-Sheet 1
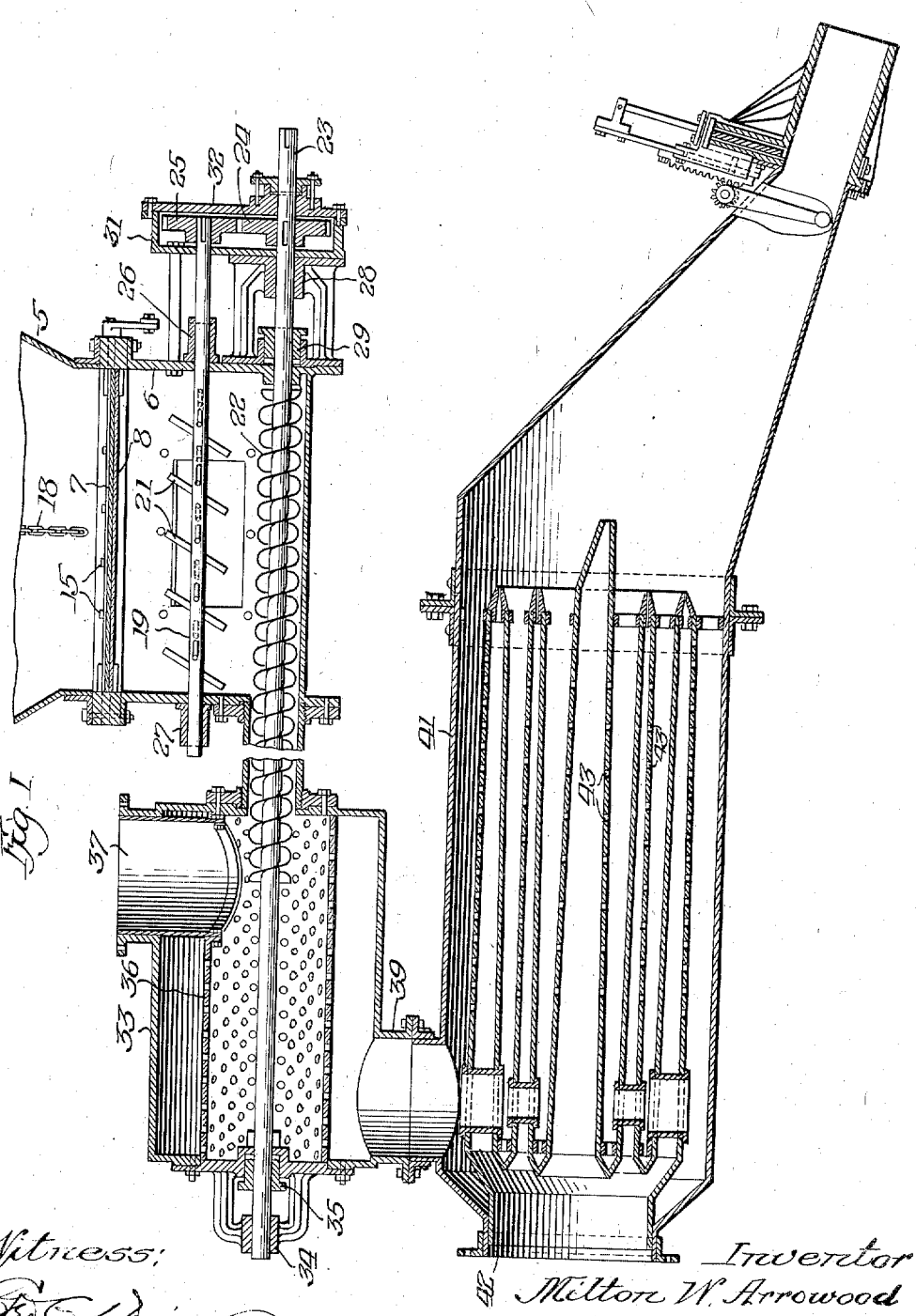

Sept. 10, 1929. M. W. ARROWOOD Re. 17,427
APPARATUS FOR HANDLING POWDERED FUEL
Original Filed March 14, 1923 2 Sheets-Sheet 2
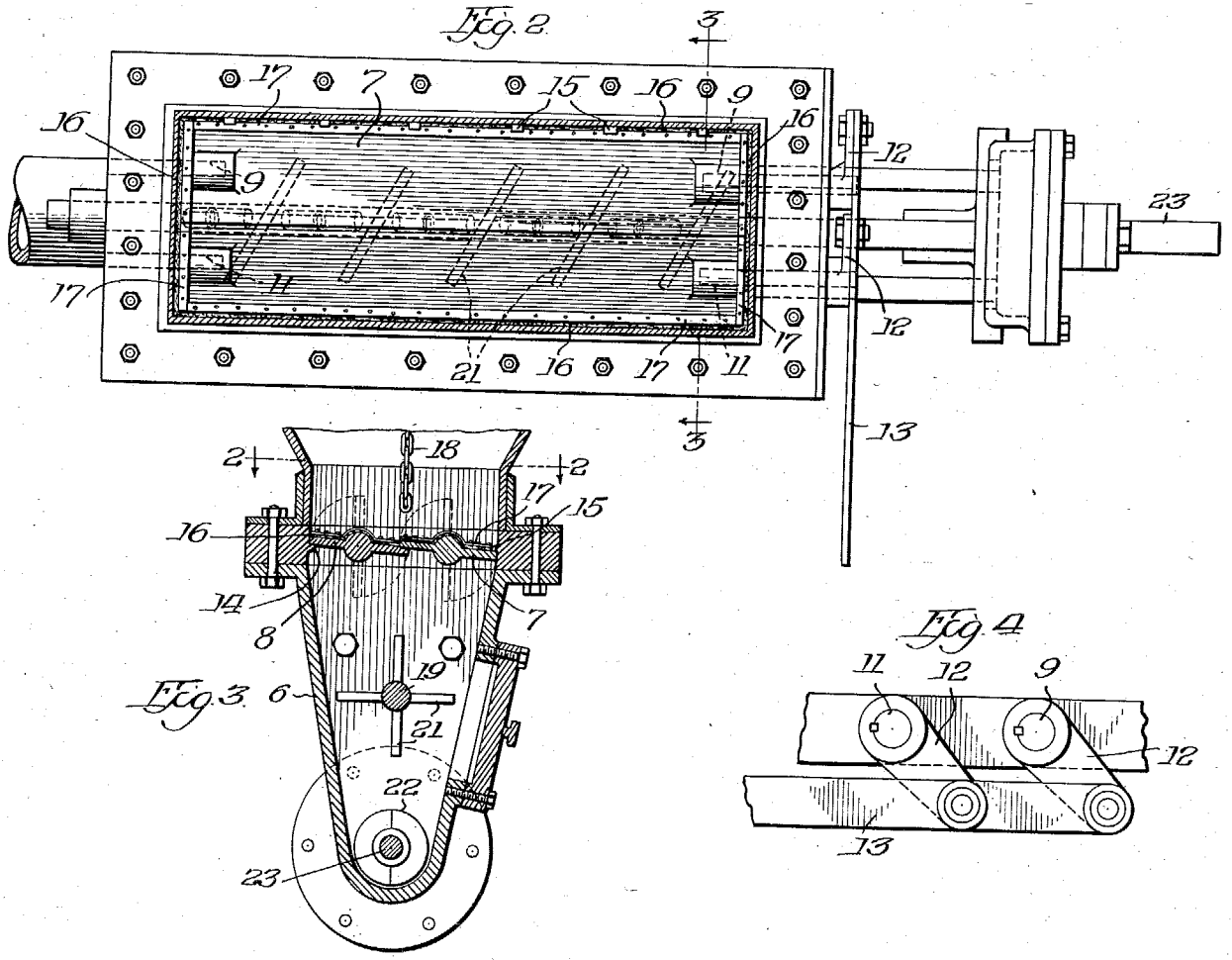
Witness:
Geo. C. Dorim
Inventor
Milton W. Arrowood
By Ira J. Wilson Atty Reissued Sept. 10, 1929.

Re. 17,427

UNITED STATES PATENT OFFICE.

MILTON W. ARROWOOD, OF NEW YORK, N. Y.

APPARATUS FOR HANDLING POWDERED FUEL.

Original application filed March 14, 1923, Serial No. 624,927. Divided and application filed January 16, 1924, Serial No. 686,506. Original No. 1,598,842, dated September 7, 1926. Application for reissue filed September 7, 1928. Serial No. 304,590.

This invention relates to the handling of powdered coal and similar material, the present application being a division of my pending application, Serial No. 624,927, filed March 14, 1923.

In feeding powdered coal from hoppers and similar containers, there is a tendency for the coal to pack and form an arch, which interferes with the continuous feeding operation. One of the purposes of my present invention is to prevent this arching and facilitate the uniform feeding of the coal.

The coal in extremely finely powdered condition has a tendency to work into the bearings of the movable parts of the apparatus with the result that they customarily wear rapidly. Another object of this invention is to dispose the bearings for the movable parts of the apparatus outside the housings in which the powdered coal is confined so that the coal is practically excluded from the bearings, and their life is thereby much prolonged.

Another purpose of the invention is to provide novel gates for regulating the delivery of powdered coal from the hopper to the mixing apparatus, which gates will prevent escape and leakage of the coal around them, and also to provide means for agitating the fuel to maintain a uniform consistency and uniform weight per cubic unit thereof.

Other objects and advantages of this invention should be readily appreciated as the same becomes better understood by reference to the following description, when considered in connection with the accompanying drawings.

Referring to the drawings:

Fig. 1 is a vertical sectional view through an apparatus embodying my invention;

Fig. 2 is a plan view partially in section of one end of the coal feeding and preliminary mixing apparatus, this figure being taken on the line 2—2 of Fig. 3;

Fig. 3 is a sectional view on the line 3—3 of Fig. 2; and

Fig. 4 is a fragmentary view of the mechanism for operating the control gates shown in Figs. 2 and 3.

Referring now to the drawings more in detail, reference character 5 indicates generally the lower portion of a hopper in which the powdered coal is stored and from which it is fed, this hopper being connected by a closed joint with a tapered trough or receptacle 6 into which the powdered material falls by gravity from the hopper when the control gates are open. The gates 7 and 8, which may be of any preferred form, either curved or flat as shown, are mounted on shafts 9 and 11, respectively, extending through the walls of the hopper base and journaled in outboard bearings. Each shaft is provided outside the hopper with an arm 12 which arms are connected by an operating link 13. It will be manifest that by moving the link 13 longitudinally, rotative movements will be imparted to the shafts 9 and 11, to open and close the gates. It will be observed from Fig. 3 that a stop ledge 14 is disposed beneath the outer edge of gate 8 and a similar ledge 15 is disposed over the outer edge of gate 7, whereby the movements of these gates in one direction are limited. The inner edges of the gates overlap when in closed position so that when the gates are positioned as shown in full lines in Fig. 2, the flow of material from the hopper is completely shut off. By rotating the gates in a clockwise direction, viewing Fig. 3, they may be opened or partially opened to any desired degree, as indicated in dotted lines, to permit the requisite flow of material from the hopper. To insure a leak-tight fit, the margin of each gate is preferably provided with a felt sealing strip 16, held in place by a retaining strip 17, which holds the felt strip snugly against the end walls of the passage.

The tapered shape of the hopper induces a tendency of the coal in the hopper to form an arch over the gate or gates so that it will not feed uniformly. This objectionable arch, however, may be obviated by suspending within the hopper one or more heavy chains 18 which hang down to a point in proximity to the gate. The constant vibration of such a chain or chains resulting from the operation of the machinery, prevents the objectionable arching of the material in the hopper.

Beneath the gate within the trough 6 and above the bottom thereof, there is mounted a rotatable shaft 19, provided with radially extending spokes or fingers 21, preferably inclined with respect to the longitudinal axis of said shaft and adapted upon rotation of the shaft to agitate the material passing through the trough, thereby breaking any caked lumps or chunks therein and mixing the same so as to insure a uniformity in the consistency and specific gravity of the fuel, as well as facilitating the feeding of the coal to the feed screw 22 disposed in the bottom of the trough. This feed screw is mounted upon a shaft 23 driven from any suitable source of power, and equipped with a gear 24 which meshes with and drives a companion gear 25 on the shaft 19. In order to prevent leakage of the coal around the shafts and to preclude its entrance as much as possible into the bearings, shaft 19 is mounted in outboard bearings 26 and 27, and shaft 23 is mounted at one end in an outboard bearing 28 and extends through a stuffing box 29 having the usual tight fitting packing gland, by which leakage of coal around the shaft is precluded. The gears 24 and 25 are further protected from coal dust by housing 31 surrounding the same, the outer plate 32 of which may be made removable to permit access to the gears.

The other end of shaft 23 extends through a shell 33 and is journaled in an outboard bearing 34, leakage at this end of the shaft being prevented by a stuffing box 35. It is obvious that shafts 9, 11 and 19 although they do not carry feeding screws tending to force the fuel toward one end thereof may be provided with similar outboard bearings and stuffing boxes should they prove desirable or necessary. Within the shell 33 there is disposed around the shaft a perforate cylinder 36, into which the coal is delivered by the feed screw 22. Air under suitable pressure is delivered to the interior of the cylinder 36 through a supply pipe 37, and this air is mixed with the coal in the cylinder, the mixture being further facilitated by the passage of the coal and air together outwardly through the perforations in the cylinder walls. From shell 33 the mixture of coal and air is discharged through a neck 39 into the mixer proper, or as it is commonly termed, the burner.

This burner may be of any preferred construction but preferably comprises, as shown for illustrative purposes, an outer cylindrical shell 41 in which are disposed a plurality of concentrically arranged shells of progressively decreasing diameter, forming a series of fuel passages alternating with air passages from which air delivered at the intake end 42 of the burner is delivered radially into the mixing passages through apertures 43. The structural details of the burner will not be further elaborated upon as they are fully described and claimed in the parent application previously mentioned.

In the operation of my invention, the hopper gates 7 and 8 having been opened the desired amount, the fuel in the hopper which is prevented from arching by the chain 18, falls by gravity into the trough 6 where it is broken up, agitated and mixed to a uniform consistency and density by the agitator finger 21. From this trough it is fed by the feed screw 22 into the perforated cylinder 36. Here it is partially mixed with air, delivered into the cylinder 36 under pressure and upon being discharged outwardly through the perforations in this cylinder it becomes further mixed as it is delivered into the surrounding cylinder 33. From this cylinder 33 it is delivered through the neck 39 into the burner and from thence into the combustion chamber.

The prevention of arching accomplished by the chain or chains 18, the control of the fuel delivery by the gates 7 and 8, and construction and operation of these gates and their capability of effectually preventing leakage around the same, the protection of the bearings in which the rotating shafts operate, the breaking up of the fuel in the trough and the delivery of the same into the preliminary mixing cylinder, and the advantages of these various features should be appreciated without further description. By the term powdered fuel it is intended to include any fuel of that nature whether it be finely comminuted, powdered, pulverulent or the like. Obviously, the structural details illustrated and described may be varied within considerable limits without departing from the essence of the invention as defined in the following claims.

I claim:

1. In an apparatus for feeding powdered fuel, the combination of a hopper, a trough beneath said hopper, a control gate for controlling the delivery of fuel from said hopper to said trough having a movable section for said gate, means in the hopper for preventing arching of the fuel therein, means in the trough for agitating and breaking up the fuel delivered thereto from the hopper, and a feed screw for delivering said fuel from the trough.

2. In an apparatus for feeding powdered fuel, the combination of a hopper, a control gate for controlling the delivery of material therefrom, felt sealing strips for preventing leakage around the margins of said gate, said gate comprising a pair of rotatable overlapping sections mounted in the hopper, and oppositely acting stop ledges engageable with the sections at the strips to limit the movements of the gates to closed positions.

3. In an apparatus for feeding powdered fuel, the combination of a hopper, a pair of rotatably mounted control gates mounted beneath said hopper so that adjacent margins of said said gates overlap when the gates are in closed position, abutments against which the outer margins of said gates close.

4. In an apparatus for feeding powdered fuel, the combination of a hopper, a rotatable control gate mounted in outboard bearings beneath said hopper, abutment means for limiting the closing movement of said gate, and sealing strips for preventing leakage around the gate.

5. In an apparatus for feeding powdered fuel, the combination of a hopper, a pair of rotatable gates mounted in outboard bearings beneath said hopper, said gates being adapted to overlap when in closed position, abutments for limiting the closing movements of said gates, and means for preventing leakage around the gates.

6. In an apparatus for feeding powdered fuel, the combination of a hopper, and means for controlling the discharge from said hopper, said means comprising a plurality of gates rotatably mounted on horizontal axes and adapted to overlap when in closed position.

7. In an apparatus for feeding powdered fuel, the combination of a hopper, and a plurality of rotatable control gates mounted in juxtaposed relation with each other across the outlet of said hopper so that adjacent margins of the gates co-operate when the gates are in closed position to seal the outlet.

8. In an apparatus for feeding powdered fuel, the combination of a hopper, and a pair of rotatable control gates mounted in juxtaposed relation with each other across the outlet of said hopper so that adjacent margins of the gates contact with each other when the gates are in closed position to seal the outlet.

9. In an apparatus for feeding powdered fuel, the combination of a hopper, a pair of rotatable control gates mounted in juxtaposed relation with each other across the outlet of said hopper so that adjacent margins of the gates co-operate when the gates are in closed position to seal the outlet and abutments for limiting the closing movements of said gates.

10. In an apparatus for feeding powdered fuel, the combination of a hopper, and means for controlling the discharge from said hopper, said means comprising a plurality of gates rotatably mounted across the outlet of the hopper and adapted when in closed position to seal said outlet.

11. In an apparatus for feeding powdered fuel, the combination of a hopper, and means for controlling the discharge from said hopper, said means comprising a rotatable gate mounted across the outlet of the hopper and adapted when in closed position to seal said outlet.

12. In an apparatus for feeding powdered fuel, the combination of a hopper, a rotatable control gate beneath said hopper and sealing strips for preventing leakage around the gate.

13. In an apparatus for feeding powdered fuel, the combination of a hopper, a trough beneath said hopper, a feed screw for delivering fuel from the trough, and a chain freely suspended within the hopper above the feed screw and operable by vibration for preventing arching of the fuel delivered to said trough from the hopper.

14. In an apparatus for feeding powdered fuel, the combination of a hopper, a rotatable control gate mounted in outboard bearings beneath said hopper and stuffing boxes for preventing leakage along the control gate axis from said hopper to said bearings.

15. In an apparatus for feeding powdered fuel, the combination of a hopper, and means for controlling the discharge from said hopper, said means comprising a plurality of gates rotatably mounted across the outlet of the hopper and link mechanism for insuring equal movement of the gates to and from closed position.

16. An apparatus for feeding powdered fuel comprising a fuel hopper, a pair of rotatable vertically swinging control gates pivoted intermediate their width and mounted beneath said hopper so that adjacent margins of said gates overlap when the gates are in closed position, and abutments against which the margins of said gates close.

17. An apparatus for feeding powdered fuel including a hopper, a trough beneath said hopper, a control gate for controlling the delivery of material from said hopper to said trough, and means for sealing the margins of said gate against leakage, said gate including a plurality of movable sections mounted in the hopper and limited in their movements in opposite directions.

18. An apparatus for feeding powdered fuel including the combination of a hopper, a feed screw for delivering fuel from the hopper with a chain freely suspended within the hopper above the feed screw for preventing arching of the fuel in said hopper.

19. In an apparatus for feeding powdered fuel, a fuel hopper, a trough beneath said hopper, means for controlling the delivery of fuel from said hopper to said trough and means for controlling the density of the fuel delivered from said trough comprising the combination of a rotatable member in the trough provided with spokes inclined with respect to the longitudinal axis of said member for agitating and breaking up the fuel delivered to the trough from the hopper, with a feed screw for delivering the fuel from the trough.

20. In an apparatus for feeding powdered fuel, a fuel hopper, a compartment beneath said hopper, and means for controlling the delivery and density of the fuel from said compartment comprising the combination of a rotatable member in the compartment provided with spokes inclined with respect to the longitudinal axis of said member for agitating and breaking up the fuel delivered to the compartment from the hopper, with means for delivering the fuel from the compartment.

21. In an apparatus for feeding powdered fuel, means for controlling the flow of powdered fuel comprising a rotatable member provided with spokes inclined with respect to the longitudinal axis of said member.

22. In an apparatus for feeding powdered fuel, means for controlling the flow of density of powdered fuel comprising a rotatable member provided with a plurality of series of longitudinally spaced spokes inclined with respect to the longitudinal axis of said member, the spokes of one series being arranged in an axial plane which is disposed at an angle to that of another series.

23. In an apparatus for feeding powdered fuel, a fuel hopper and means for delivering the fuel from said hopper comprising the combination of an agitating member, with a positive feeding element whereby the fuel is delivered from said hopper at a uniform density.

24. In an apparatus for feeding powdered fuel, a fuel hopper and means for delivering the fuel from said hopper in controlled amounts of uniform density comprising the combination of a gate for said hopper and an agitating member, with a positive feed screw for delivering fuel from said hopper whereby the fuel delivered from said hopper is of uniform density.

25. The method of delivering powdered fuel to a point of combustion which comprises controlling the density of said fuel by agitating and feeding the fuel in predetermined quantities while being agitated to a point of combustion.

In witness hereof I have affixed my signature.

MILTON W. ARROWOOD.